Dec. 12, 1944.   R. K. LEE   2,364,858
CURING MACHINE
Filed Dec. 21, 1939   4 Sheets-Sheet 1

INVENTOR.
ROGER K. LEE
BY
ATTORNEYS

Dec. 12, 1944.   R. K. LEE   2,364,858
CURING MACHINE
Filed Dec. 21, 1939    4 Sheets-Sheet 3

INVENTOR.
ROGER K. LEE
BY
ATTORNEYS

Dec. 12, 1944.  R. K. LEE  2,364,858
CURING MACHINE
Filed Dec. 21, 1939   4 Sheets-Sheet 4
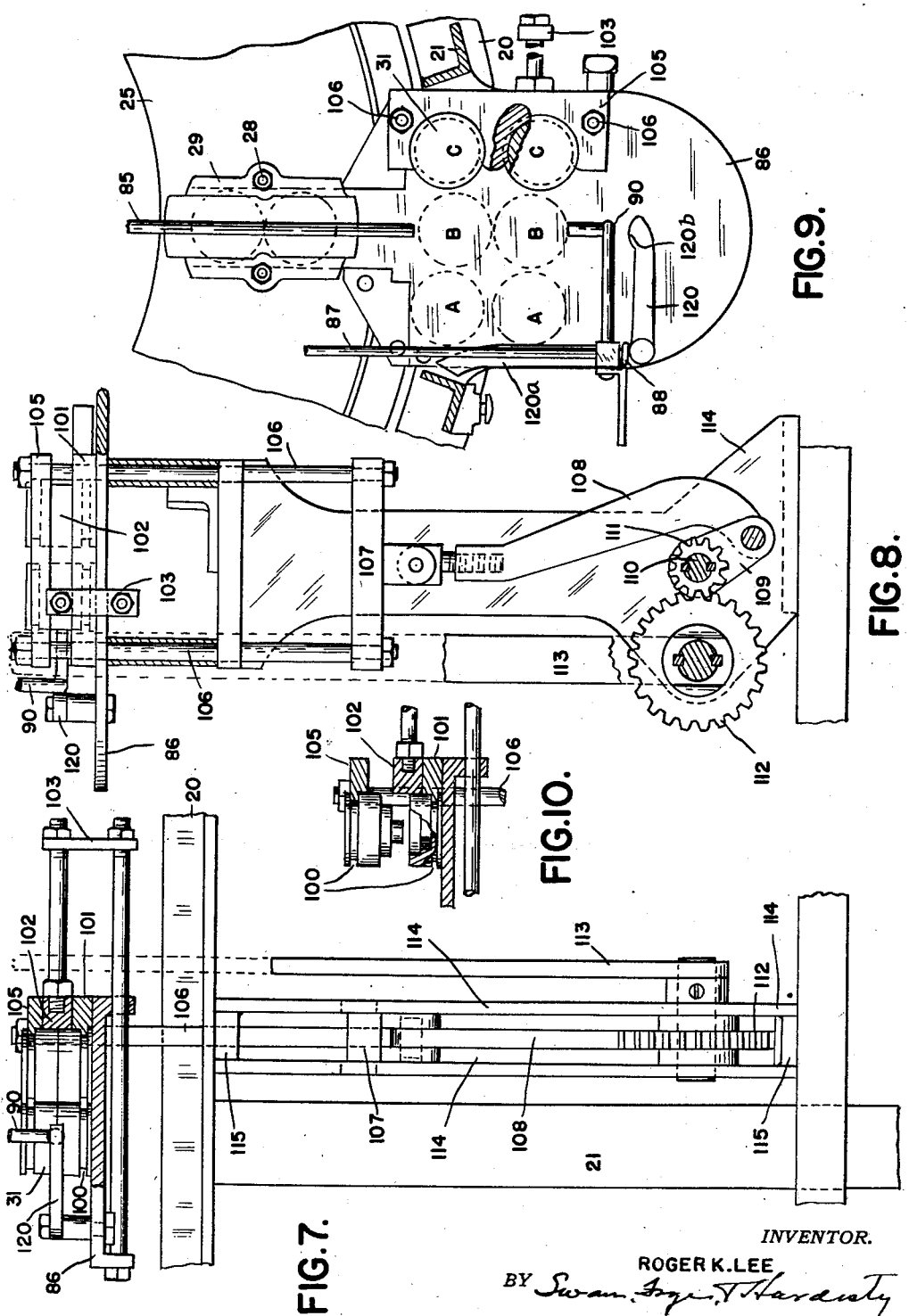
INVENTOR.
ROGER K. LEE
BY Swan, Fryer, & Hardesty
ATTORNEYS Patented Dec. 12, 1944

2,364,858

UNITED STATES PATENT OFFICE 2,364,858

CURING MACHINE

Roger K. Lee, Highland Park, Mich., assignor to Kenlee Corporation, Highland Park, Mich., a corporation of Michigan Application December 21, 1939, Serial No. 310,412

9 Claims. (Cl. 18—20)

The present invention relates to curing ovens for articles of rubber or other materials or plastics curable under heat and pressure and more particularly to ovens capable of continuous operation.

Among the objects of the invention is an oven into which are introduced one or more at a time, a plurality of single molds, these remaining in the oven a predetermined period of time and then replaced in the same order with freshly filled molds.

Another object is a machine comprising an intermittently actuated conveyor movable from a loading and unloading station through an elongated oven and back to said station.

Another object is a machine comprising a heated circular rotatable element carrying means for maintaining the molds under pressure and in close contact with itself.

Another object is a machine in which the mold conveying element, carrying the molds under high pressure, itself absorbs all of the stresses due to such pressure and to the relieving of the pressure during mold replacement.

Another object is means for relieving the mold pressure, which means is mounted in self-adjusting or "floating" relation to the mold carrier.

Still other objects will readily occur to those skilled in the art upon reference to the following description and the accompanying drawings, in which:

Fig. 6 is a side view of the indexing lever.

Fig. 7 is a front elevation of the loading and unloading mechanism.

Fig. 8 is a side elevation thereof.

Fig. 9 is a plan view thereof, and

Fig. 10 is a sectional view of a mold and the mold opening means.

Figure 4:
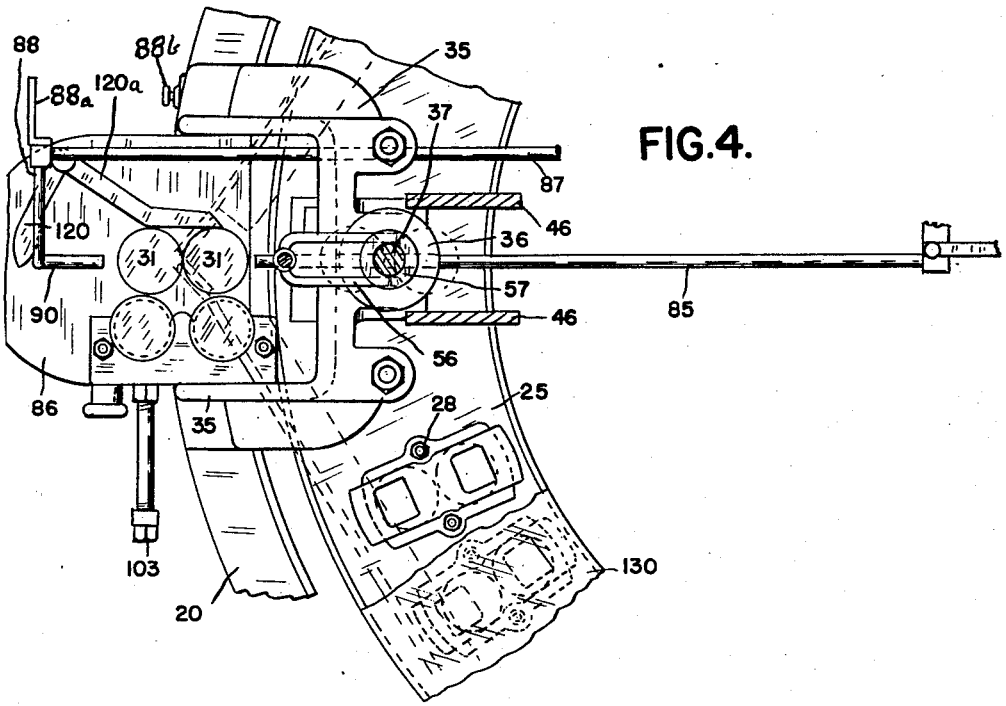
Fig. 4 is a horizontal section on line 4—4 of Fig. 3.

As indicated in the drawings, the machine comprises a circular frame 20 supported upon suitable leg structure 21, the circular frame 20 serving to support the later described mechanism and also carrying a plurality of rollers 22 upon which is a flat annular hollow table 25, capable of being rotated, and to which steam may be supplied through one or more pipes such as is shown at 26.

Figure 1:
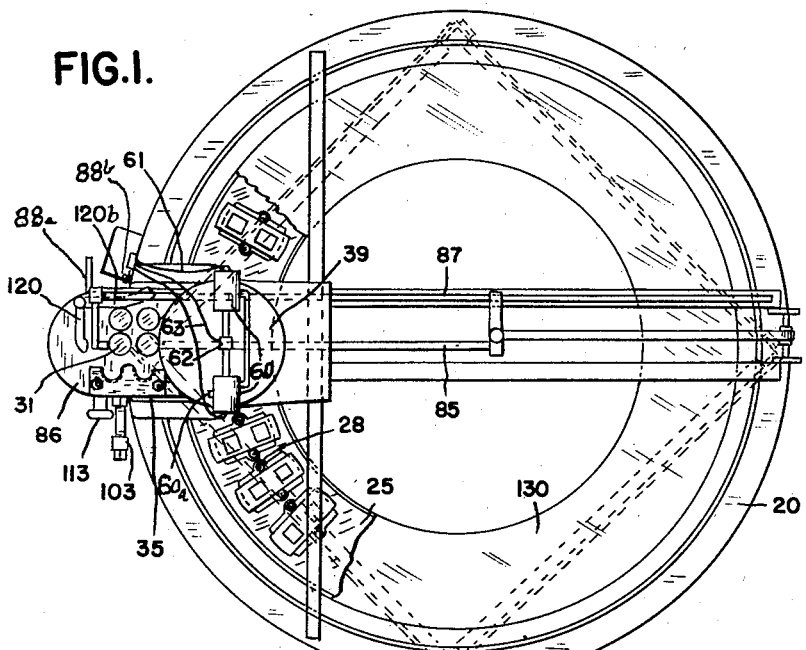
Fig. 1 is a plan view of the machine.
Figure 3:
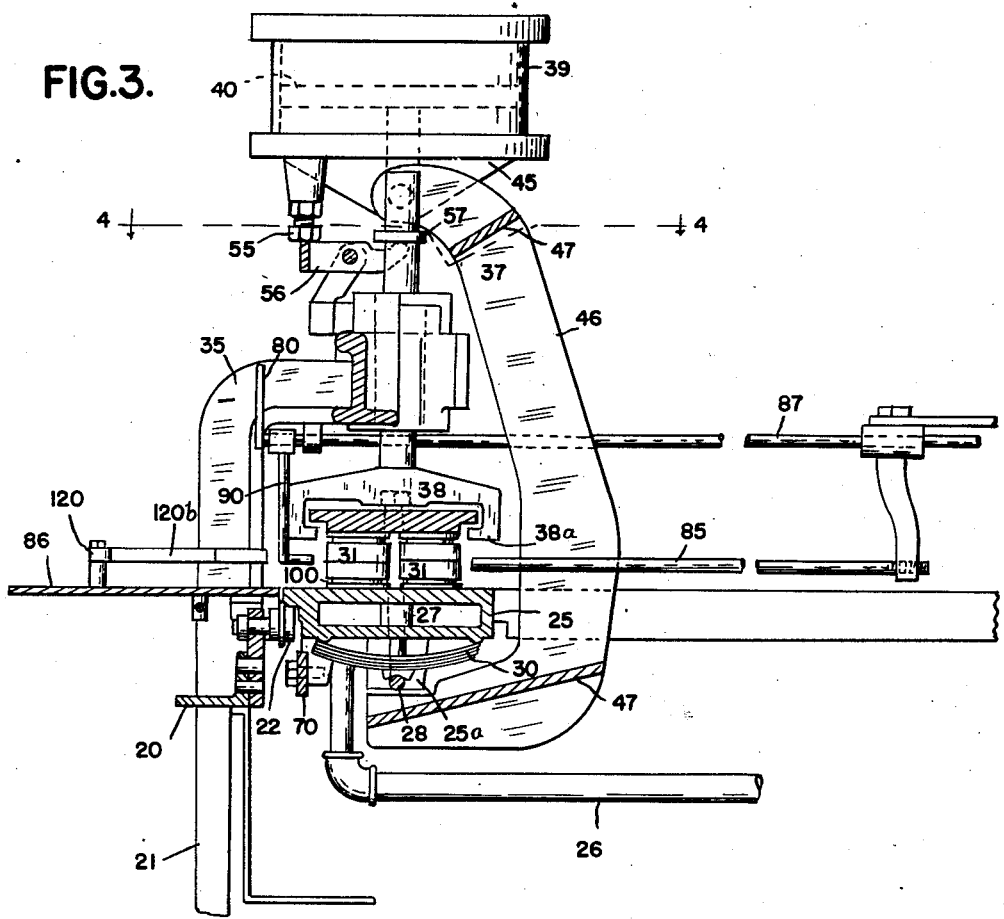
Fig. 3 is a vertical section on line 3—3 of Fig. 2.
Figure 5:
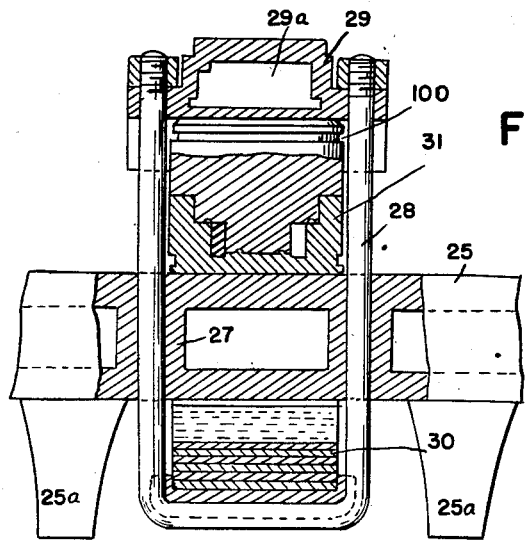
Fig. 5 is a section through one of the mold holding clamps.

The table 25 is also provided with a plurality of internal bosses 27 located midway between the circular walls and bored for the passage through the table of the U-bolts 28 forming part of the mold clamping means, the latter consisting of such U-bolts passing up through the table and fixed to plates 29 and drawn downwardly with considerable force through the action of springs 30 acting between the U-bolts and the bottom of the table 25. In Fig. 5, one of the molds is shown at 31 as being clamped to the table and, as indicated in Figs. 1, 3 and 4, there will be a plurality of such clamping means equispaced about the annular table 25, each arranged to hold two molds.

Since the clamping means, through spring 30, is arranged to exert considerable pressure upon the molds 31, means is provided to release the latter so as to permit their removal for the purpose of loading and unloading. Such means is shown best in Figs. 1 and 4.

As indicated in these figures, the frame 20 is provided with an upward extension 35, overhanging the table 25, the overhang being provided at its center with a bearing 36 for a longitudinally movable shaft 37, which shaft carries at its lower end a gripping element 38 and at its upper end extends into a working cylinder 39 where it is fixed to a piston 40.

The lower end of cylinder 39 carries a pair of lugs 45 to which are connected a pair of C-clamps 46 which may be fixed together as by cross webs 47, and which extend down and under the table 25 and are arranged to contact therewith when motive fluid is admitted to the cylinder above the piston.

As indicated above, the shaft 37, the piston rod, carries at its lower end a gripping element 38. This is a claw-like element of the same width as one of the clamp plates 29 and somewhat longer, being provided at its ends with depending hook portions 38a adapted to grasp the ends of the plates 29 and, by lifting the latter, to compress springs 30 and release the molds.

Also carried by the lugs 45 are two adjustable abutments 50 arranged to contact the upper ends of two vertical presser rods 51 slidably mounted in frame 35 and maintained in their upper position by springs 52.

A third adjustable abutment 55 is also carried by the lower end of the cylinder in position to coact with one end of a forked lever 56, fulcrumed upon frame 35 and having its other forked end adapted to coact with a collar or flange 57 fixed upon piston rod 37.

Suitable valves 60 mounted upon cylinder 39 control the admission of compressed air to the cylinder above and below the piston and also allow the escape of air to the atmosphere, the control lines thereto being indicated at 61. These valves 60 are controlled in any suitable manner as by an actuator 62, itself being controlled through the line 63. These several lines may be provided with cam actuated valves (not shown) in the well known manner, actuated by the motor which actuates the indexing means about to be described, while the air supply is admitted at 60a.

Figure 2:
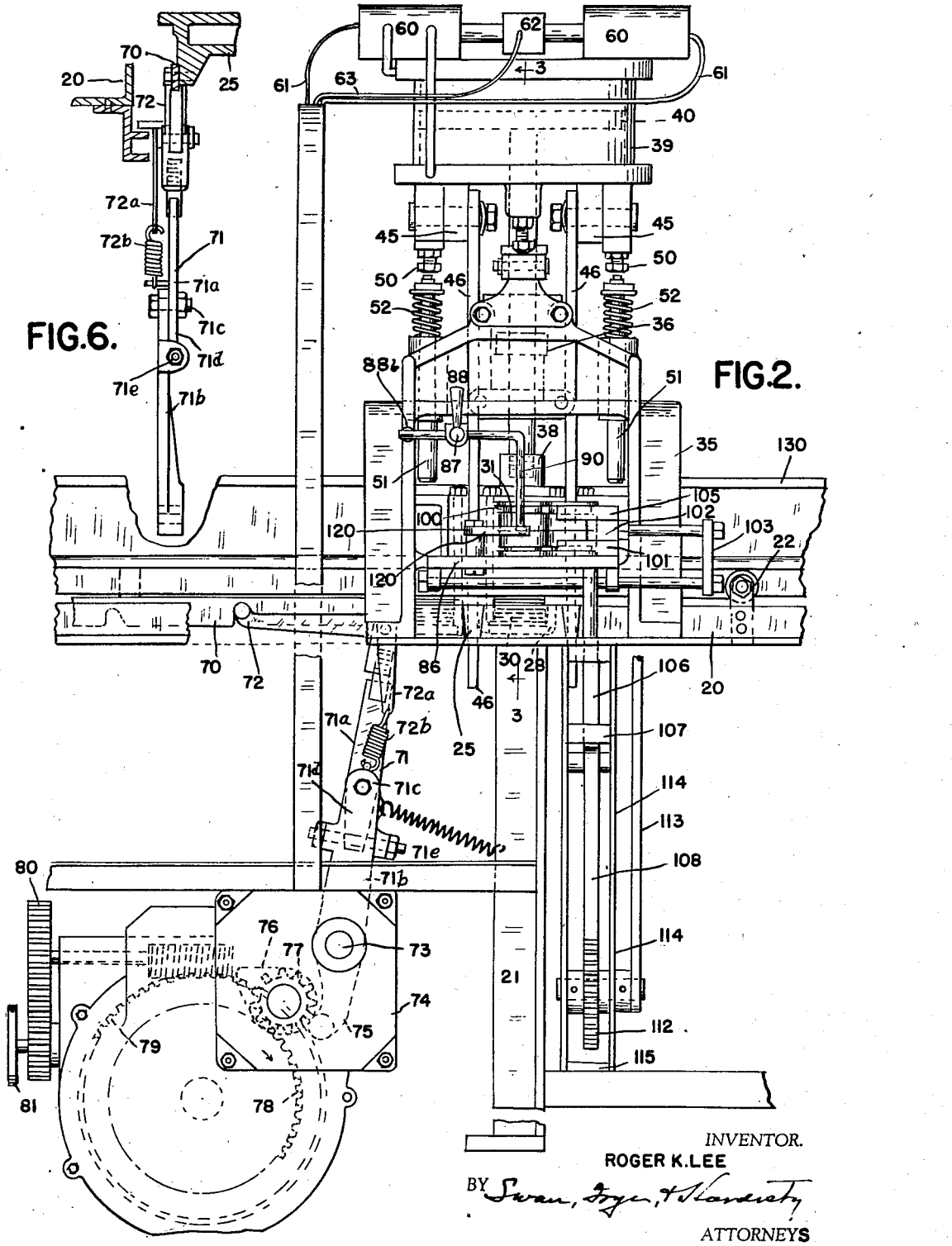
Fig. 2 is a partial elevation, on an enlarged scale.

As shown in Figs. 2, 3 and 6, the table 25 has fixed thereto a circular rack 70, having as many downwardly opening notches as there are mold clamps 28—29, which rack is acted upon to index the table by an arm 71 carrying at its upper end a pawl 72, and itself fixed to a shaft 73 mounted in the walls of a housing 74. Within the housing 74, the shaft 73 carries a cam follower 75 coacting with a cam 76 fixed upon a shaft carrying a small pinion 77, which coacts with a large mutilated gear 78, and the latter rotated by a suitable worm reduction gearing 79. The reduction gearing is in turn actuated by a spur gear train 80 from a drive wheel 81 driven by a suitable motor (not shown).

It will be noted that through the gearing 79—80, a large reduction from motor speed is accomplished but in order to provide a quick action of the arm 71, the movement of gear 77 and cam 76 is again speeded up.

Gears 77 and 78 are so arranged as to produce one revolution of the cam 76 and consequently one movement of arm 71 for each revolution of gear 78 and the latter may of course be properly timed by the selection of the gears 80.

As shown in Figs. 2 and 6, the lever arm 71 is made in two parts 71a and 71b pivoted together at 71c and the part 71a provided with an extension 71d adjustably fixed by the screws 71e in proper position.

Further, the pawl 72 consists of a bellcrank pivoted at the upper end of arm 71 with its rear portion 72a lying along the arm. This rear portion 72a is connected to the arm 71 by means of a tension spring 72b tending to maintain these two parts 72a and 71 in alignment, so that, when the parts are in the position of Fig. 2, the pawl is biased toward the rack, but, when the arm 71 has been swung beyond its vertical position, the pawl will be biased away from the rack—in operation, the pawl will be held in the rack by friction during its forward movement.

In the operation of the parts so far described, the indexing of the table 25 is accomplished when the claw 38 and associated elements are in "neutral" position and in this position, the claw 38 is lifted slightly from the position of Fig. 3 while the C clamps 46 are slightly lower than shown in this figure.

This condition is established by exhausting the air from both sides of piston 40 and allowing the cylinder 39 and clamps 46 to drop by gravity. In doing so, these connected parts apply their weight, through abutment 55 to lever 56 and through the latter lift the piston and rod 37. It should be noted that cylinder 39 and clamps 46 are in floating relation to the frame 35 and table 25.

After the indexing, and when one of the mold clamps is within the claw 38, air is admitted under the piston 40. This produces several effects. In starting the piston 40 upward, the cylinder is, of course, started down, but in starting down, the cylinder with the abutments 50 moves only a short distance before striking the presser rods 51. Further movement will then move the latter down until they rest upon the two adjacent mold clamp plates 29, and still further upward movement of the piston causes the claw 38 to lift the plate 29, with which it is engaged, and thereby compress its spring 30 to release the mold. When the molds 31 have been thus released, they may of course be removed, emptied, refilled and returned or others substituted.

After a predetermined period the air under piston 40 is exhausted and pressure is applied above the piston. When this is done, the claw 38 immediately moves downwardly and allows the mold clamp to grasp the mold, but the cylinder continues its upward movement, carrying with it the C-clamps 46 to contact with the under side of table 25, so that high pressure, in addition to that exerted by springs 30, is exerted upon the molds. This high pressure will be exerted for a short period in order to insure complete closing of the molds and to squeeze out any excess rubber. The next step is to exhaust the air from both sides of piston 40 and allow the parts to assume the "neutral" position.

In order to permit the C-clamps 46 to pass the lower portions of the mold calmps, suitable lugs 25a are formed on the under side of table 25 between the locations of internal bosses 27. The removal and insertion of molds 31 is accomplished by the hand operated means shown clearly in elevation in Fig. 3.

This means consists of a longitudinally movable rod 85 arranged in position to move the molds 31 from the mold clamps outwardly upon a table 86 fixed to frame 21. The rod 85 is carried by a second slidably mounted rod 87 extending to the front of the machine and provided with a suitable handle 88.

In addition, however, to handle 88, the rod also carries a downwardly and rearwardly projecting portion 90 near the handle serving to shove loaded molds 31 back into clamping position when the handle is pushed back to rest position and also carries a lateral projection 88a which, when the handle is moved to its extreme inward position, presses the button 88b. This button is through a suitable airline, arranged to shift valves 60 to relieve the pressure upon the under side of piston 40 and apply pressure to the upper sides in advance of the action of the automatic control.

Further, in order to facilitate the operations of opening the molds and replacing them in the machine, in addition to rod 85, there is provided the opening and handling means shown in detail in Figs. 7 to 10. In these figures, the molds are shown as provided with grooves 100 near the top and bottom and the table 86 provided at one side with a mold bottom holder 101 in the form of a plate having rounded recesses to receive the molds and a tongue or rib adapted to enter the bottom groove 100. This member is fixed to table 86. Lying upon member 101 is a notched pusher member 102 carried by a frame 103 slidably mounted in suitable lugs below the table 86.

Mounted above member 102 and registering with holder 101 is a second mold holding member 105 shaped and ribbed similarly to the bottom holder 101, to hold the top of the mold. This holder member 105 is fixed to the upper ends of two rods 106 extending down through holder 101 and vertically slidable. These rods 106 at their lower ends are fixed to a cross head 107 movable up and down by a pitman 108 connected in turn to a crank arm 109 fixed to a shaft 110 carrying, also fixed, a small pinion 111. Pinion 111 is rotatable by a second gear 112 itself rotatable by means of a lever 113. The gearing 111—112, pitman 108, crosshead 107 and rods 106 are mounted in and guided by a suitable supporting frame shown as made of side plates 114 welded or otherwise fixed to suitable spacing members 115 at top and bottom.

In order to facilitate the moving of the molds 31 into and out of the machine, there is pivotally mounted upon table 86 a bellcrank lever 120. This lever is so arranged and proportioned as to move a pair of molds from position A (Fig. 9) to position B when the element 90 strikes the portion 120b of the lever.

Assuming the molds in position A to be ready to move into the machine, drawing back the ejector rod 85 to move out a pair of molds, will put these in position B. A further movement of the handle will then cause the lever 120 to move all four molds to the right, moving molds B to position C, i. e., into holders 101—105, while molds A are moved to position B, i. e., in position to be moved by element 90 into the machine. This movement having taken place, the molds in holders 101—105 are opened by moving lever 113, thus lifting the tops of the molds as indicated in Fig. 10, the cured article removed, a new charge placed in the mold, and the top lowered and initially compressed by actuating lever 113. After the molds are charged, they are moved over to position A by means of the element 102.

As stated above, steam will be supplied to the interior of table 25 and may also be supplied to the several mold clamp plates 29, these being made hollow as indicated at 29a, Fig. 5, or, if desired, the jacket of table 25 may be made sectional and cooling fluid supplied subsequent to the heating.

It will be noted from the above description, that, in the present method of curing rubber articles, the molds are subjected for a short time to a very high pressure and that then the pressure is maintained at a lower point during the curing period.

The higher pressure has two functions—it causes the rubber to flow into all parts of the mold and squeezes out the excess and presses the mold parts tightly together and against the platen to thereby facilitate heat flow into the mold and to all parts thereof.

After the initial pressure has accomplished its functions, the pressure may be reduced somewhat and the springs 30 relied upon to maintain the parts in close relationship. The sequence of operations preferably carried out in the making and curing of rubber articles is as follows:

Suitably sized slugs of uncured rubber mix are supplied to a mold or molds in the closing device, and after closing, these are moved into position to be utilized for moving ejected molds into the opener and themselves be moved into position to be moved into the oven.

The freshly filled molds are then moved into the oven and are immediately subjected to high pressure.

After the molds have been subjected to such high pressure for a short period, the pressure is somewhat reduced and the molds heated for a predetermined period while maintaining the lower pressure. The molds are then removed, cleared, refilled and again moved into the oven.

Now having described the invention and its preferred embodiment, what I claim is:

1. In a machine for curing materials under heat and pressure, a mold for such materials, a table adapted to be heated, and means for clamping said mold to said table, said means consisting of parallel rods passing through said table, a cross member secured to said rods and resting upon said mold upon said table and spring means acting upon the lower ends of said rods to draw said plate and mold tightly against said table.

2. In a machine for curing materials under heat and pressure, a heated support, a mold for containing the said materials, means for clamping said mold to said support, said means including a compression spring acting against the underside of said support, and means for compressing said spring to release said mold said last-mentioned means reacting against the upper side of said support.

3. A machine including a support, a plurality of articles carried thereby, means for individually clamping said articles upon said support, said means comprising a clamping member passing over an article and having portions passing downward through said support and a compression spring acting on said portions and biased to draw said member downwardly to thereby clamp said article to said support, means for lifting said clamping member against said spring compression to thereby release said article and means whereby the reaction to said lifting is applied to adjacent articles and thereby to the upper side of said support.

4. A machine for curing materials under heat and pressure comprising a frame, an annular table rotatably mounted upon said frame and provided with a row of clamping devices each including a compression spring acting against the underside of said table, a loading station for the machine including an upward extension of said frame carrying a bearing the axis of which is vertical and in alignment with said row of clamping devices, a slidable shaft in said bearing, said shaft carrying at its upper end a piston and at its lower end means adapted to cooperate with said clamping devices to exert either pressure or a lifting effect thereon and thereby effect the compression of said spring, a working cylinder fitting said piston, and a C-clamp attached to said cylinder and extending to beneath said table the lower arm of said C-clamp being in alignment with said shaft and adapted to contact the underside of said table and absorb reaction forces when said shaft is moved downwardly to exert pressure on said clamping devices.

5. A machine for curing materials under heat and pressure comprising a frame, an annular table rotatably mounted upon said frame and provided with a row of clamping devices each including a compression spring acting against the underside of said table, a loading station for the machine including an upward extension of said frame carrying a bearing the axis of which is vertical and in vertical alignment with said row of clamping devices, a slidable shaft in said bearing, said shaft carrying at its upper end a piston and at its lower end means adapted to cooperate with said clamping devices to exert either pressure or a lifting effect thereon, a working cylinder fitting said piston, a C-clamp attached to said cylinder and extending to beneath said table, whereby to apply the reaction to said table when said cylinder and piston are actuated to apply pressure to said clamping devices, and means for applying the reaction to the top of said table when said cylinder and piston are actuated to exert a lifting action on said devices.

6. In a machine as set forth in claim 5, a lever fulcrumed upon said frame and constructed and arranged so that the weight of the cylinder upon one end of said lever acts to lift the shaft and piston to a "neutral" position.

7. In a machine of the character described including means carrying a plurality of separable molds and having a mold replacing station, means at said station for ejecting said molds from said carrying means, a table for receiving said ejected molds, means carried by said table for separating the molds, means also carried by said table for moving the ejected molds into said separating means, wherein they may be unloaded and refilled, and means for actuating said separating means and, and after said molds are refilled, for applying pressure thereto.

8. In a machine of the character described including means carrying a plurality of separable molds and having a mold replacing station, means at said station for ejecting said molds from said carrying means, a table for receiving said ejected molds, means carried by said table for separating the molds, means also carried by said table and actuable by said ejection means for moving the ejected molds into said separating means, wherein they may be unloaded and refilled, and means for actuating said separating means, and, after said molds are refilled, for applying pressure thereto.

9. In a machine of the character described having a table movable on suitable bearing means and carrying clamping devices biased to clamping condition, means for actuating said devices to release said devices from clamping condition or to add to clamping pressure, said means being mounted in floating relation to said table and including means for applying all reaction forces to said table, whereby to relieve said table bearing means of forces incident to such releasing or additional pressure.

ROGER K. LEE.